Dec. 1, 1931.          I. J. MORSE          1,834,495
CABLE AND STRAND CLAMP
Filed Oct. 8, 1930
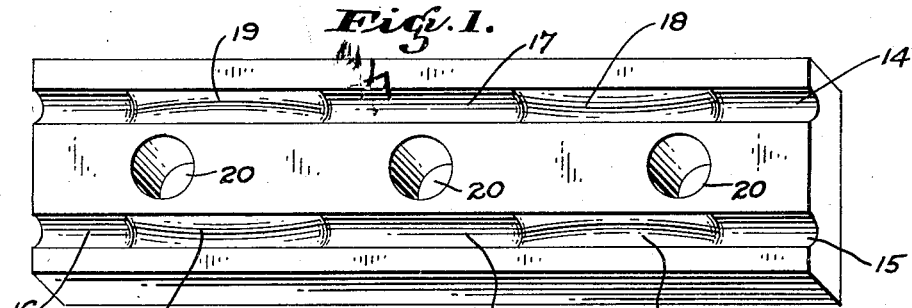
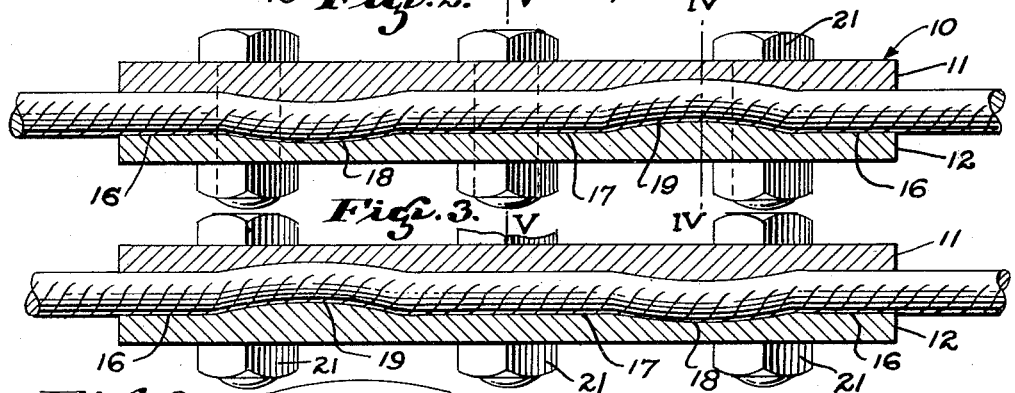
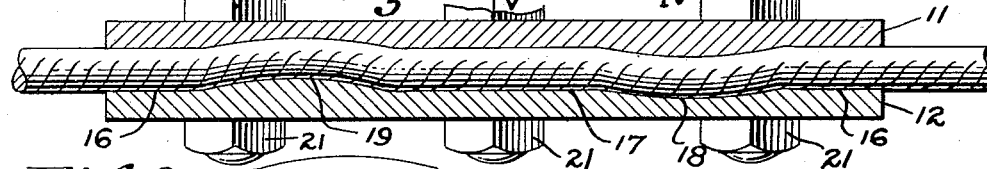
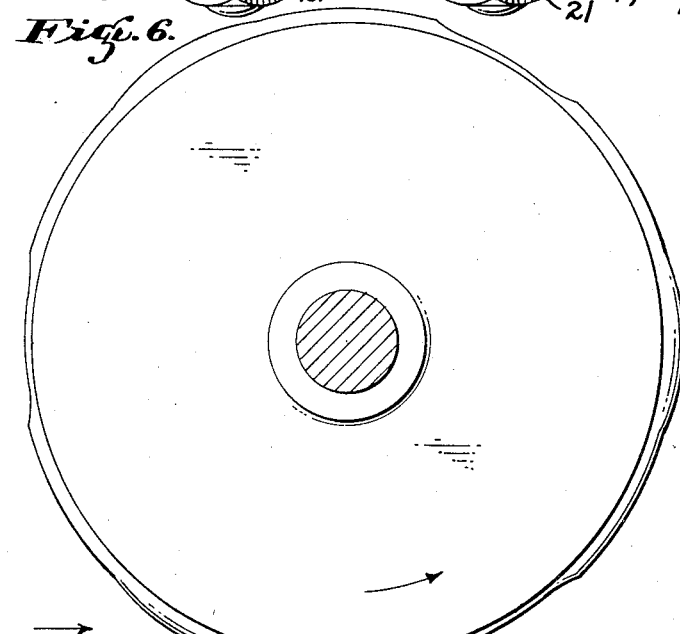
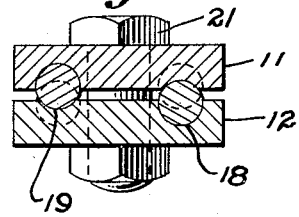
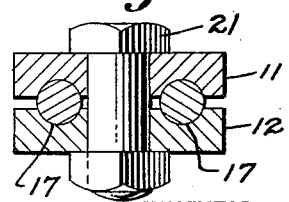
INVENTOR.
Irving J. Morse.
BY
Townsend, Loftus & Abbett
ATTORNEYS.

Patented Dec. 1, 1931

1,834,495

UNITED STATES PATENT OFFICE

IRVING J. MORSE, OF BERKELEY, CALIFORNIA

CABLE AND STRAND CLAMP

Application filed October 8, 1930. Serial No. 487,243.

This invention relates to cable clamps.

Hitherto, cable clamps in general use have been formed in complementary halves having parallel grooves therein which register so as to frictionally grip the cable when the clamp is assembled thereon. It has long been appreciated that if these grooves were sinuous that the effectiveness of the clamp would be greatly increased. Various attempts have been made to produce cable clamps with sinuous grooves to utilize this increased gripping action but none of these clamps have been successful in practice due to several reasons, chief amongst which is the fact that due to the curvature of the grooves frictional resistance made it impossible to bend the cable to conform properly to the grooves and as a result point contact alone was obtained between the cable and the clamp. This contact, of course, is less efficient than the straight groove type clamp. Another disadvantage of the clamps produced by these prior attempts was that the clamping halves were necessarily right and left and had to be selected in pairs when the clamps were to be applied.

It is the principal object of the present invention to provide a generally improved clamp of the type referred to wherein the grooves are sinuous but so formed that there is a lack of frictional resistance to bending the cable to conform with the grooves and which enables the clamping halves to be identical in construction and not right and left.

One form which the invention may assume is exemplified in the following description and illustrated by way of example in the accompanying drawings, in which:

Fig. 1 is a perspective view of one of the clamping halves of a clamp embodying the preferred form of my invention.

Fig. 2 is a longitudinal sectional view through an assembled clamp taken centrally through one of the grooves therein.

Fig. 3 is a similar view taken through the opposite groove.

Fig. 4 is a transverse sectional view taken through line IV—IV of Fig. 2.

Fig. 5 is a transverse sectional view taken through line V—V of Fig. 2.

Fig. 6 is a view disclosing the manner in which the clamps are produced.

Referring more particularly to the accompanying drawings, 10 indicates a clamp in two complementary halves 11 and 12. These halves are identical in construction so that they need not be formed right and left-hand. This is a considerable advantage as it enables clamps to be assembled at the work without the necessity of selecting a pair consisting of a right and a left-hand clamping half. It also, of course, simplifies the production of the clamps.

The inner face of each clamping half is formed with a pair of parallel grooves 14 and 15 which extend longitudinally from end to end of the clamp at equally spaced distances at opposite sides of its longitudinal center as illustrated in Fig. 1. The grooves in the face of each clamping half are semicircular in cross section and comprises what I prefer to term a straight portion 16 at opposite ends of the clamp, which portions are parallel to the face of the clamp in which the grooves are formed. At the center of the clamp a straight portion 17 is formed which extends at equal distances beyond each side of the center as illustrated. This center straight portion 17 is exactly in axial alignment with the straight portions 16 at the ends of the clamp.

Intermediate the straight portion 17 and the end portions 16 the groove is oppositely offset as at 18 and 19 so that in reality the groove is sinuous in character. The two grooves in the clamp are opposite, that is to say, the straight portions 16 and 17 are similar but the offsets are relatively opposite. That is to say, the concave offset of the portion 18 in groove 15 will be opposed in the other groove by a convex offset, while the convex offset 19 in groove 15 will be opposed by a concave offset in groove 14. The offsets are symmetrically arranged, however, so that two clamping halves of exactly the same formation may be brought into register to form two sinuous grooves of the same diameter throughout.

The clamping halves are formed with aligned bolt holes 20, in this case three being shown, one exactly in the center and the other two spaced at equal distances upon opposite sides of the center. These bolt holes are adapted to receive bolts 21 to clamp the halves together when they are assembled on a cable.

In Fig. 6 I have shown one method of forming the clamping halves. This method consists principally in providing a roller of a cam like contour of a formation alternately forming the straight sections and the offset sections of the grooves in a flat bar. In practice, a flat bar of the correct dimensions is fed beneath the roller and as the roller engages the same it will form the parallel grooves therein at properly spaced intervals. As the central straight section 17 is equal in length to both of the straight sections 16, the bar after being rolled may be cut centrally through alternate straight sections, thus forming the clamping halves. By this method the clamping halves may be inexpensively produced.

In use, when a clamp is to be assembled on the cable, the latter is usually under tension. The clamping halves are assembled over the two strands and the bolts 21 applied. As these bolts are drawn up, the high portions of the grooves will engage the cable and offset the same into the offset portions of the grooves before the cable comes in frictional contact with the straight portions of the grooves at the ends thereof. This enables the cable to be drawn inwardly from opposite ends of the clamp to accommodate the offsets before the ends of the grooves are in frictional contact with the cable and it is in this manner that I overcome the frictional resistance which hitherto made it impractical to provide a clamp of this character with sinuous grooves.

As the clamp is tightened into place, the cable is engaged by the surfaces of the grooves throughout its length so as to obtain a maximum frictional contact with the cable. I have found in actual practice that the formation of the grooves here disclosed produces a clamping action with a frictional grip more than three times greater than the ordinary type of clamp having straight grooves.

From the foregoing it is obvious that I have provided a simple and efficient clamp for clamping cable which is inexpensive to produce and which will be highly efficient in use.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A cable clamp including a pair of clamping halves, said halves having registering portions of parallel grooves formed in their contiguous surfaces and extending the entire length thereof, said grooves being disposed at equal distances upon opposite sides of the longitudinal center of the clamp and parallel to each other and to the sides of the clamp, each of said grooves being formed with opposed offsets therein, said offsets being complementary and disposed at equal distances from the center of the clamp and extending short of the ends of the clamp, the offsets of one groove being relatively opposed to the offsets of the opposite groove, and means for clamping said halves together in matched relation.

2. A cable clamp including a pair of clamping halves, said halves having registering portions of parallel grooves formed in their contiguous surfaces and extending the entire length thereof, each groove having a straight portion at the opposite ends thereof, said portions being of equal length, said grooves having a straight portion extending an equal distance beyond both sides of the center of the clamp, each groove having opposed offsets therein intermediate the straight portions, said offsets being complementary, the offsets of one groove being relatively opposed to the offsets of the other groove, and means for clamping said halves together in matched relation.

3. A cable clamp including a pair of clamping halves, said halves having registering portions of parallel grooves formed in their contiguous surfaces and extending the entire length thereof, each groove having a straight portion at the opposite ends thereof, said portions being of equal length, said grooves having a straight portion extending an equal distance beyond both sides of the center of the clamp, each groove having opposed offsets therein intermediate the straight portions, said offsets being complementary, the offsets of one groove being relatively opposed to the offsets of the other groove, said center straight portion being equal in length to the combined lengths of the end straight portions, and clamping means for clamping the halves together.

IRVING J. MORSE.